UNITED STATES PATENT OFFICE.

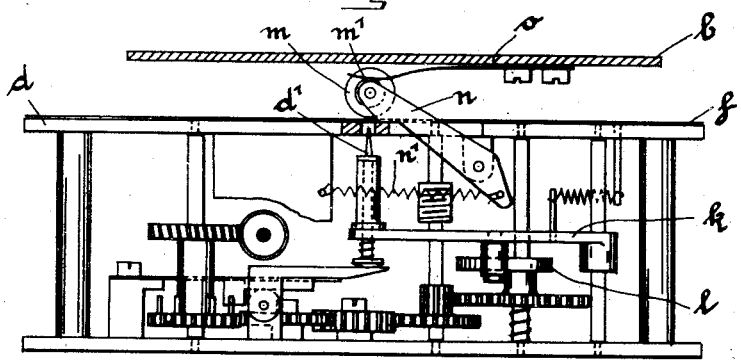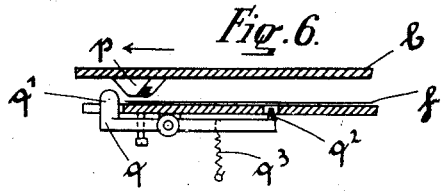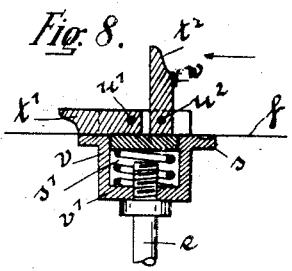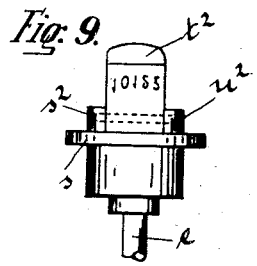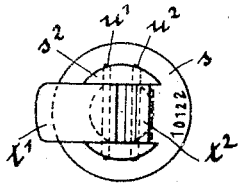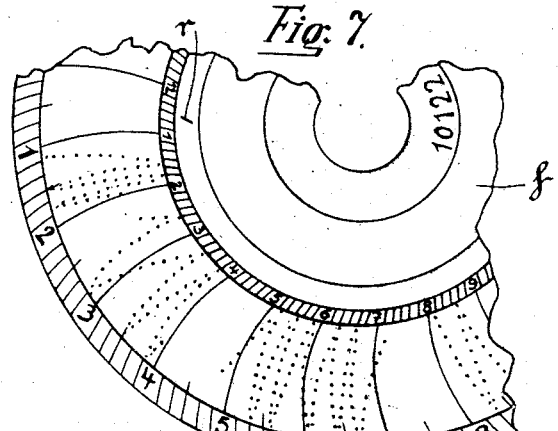

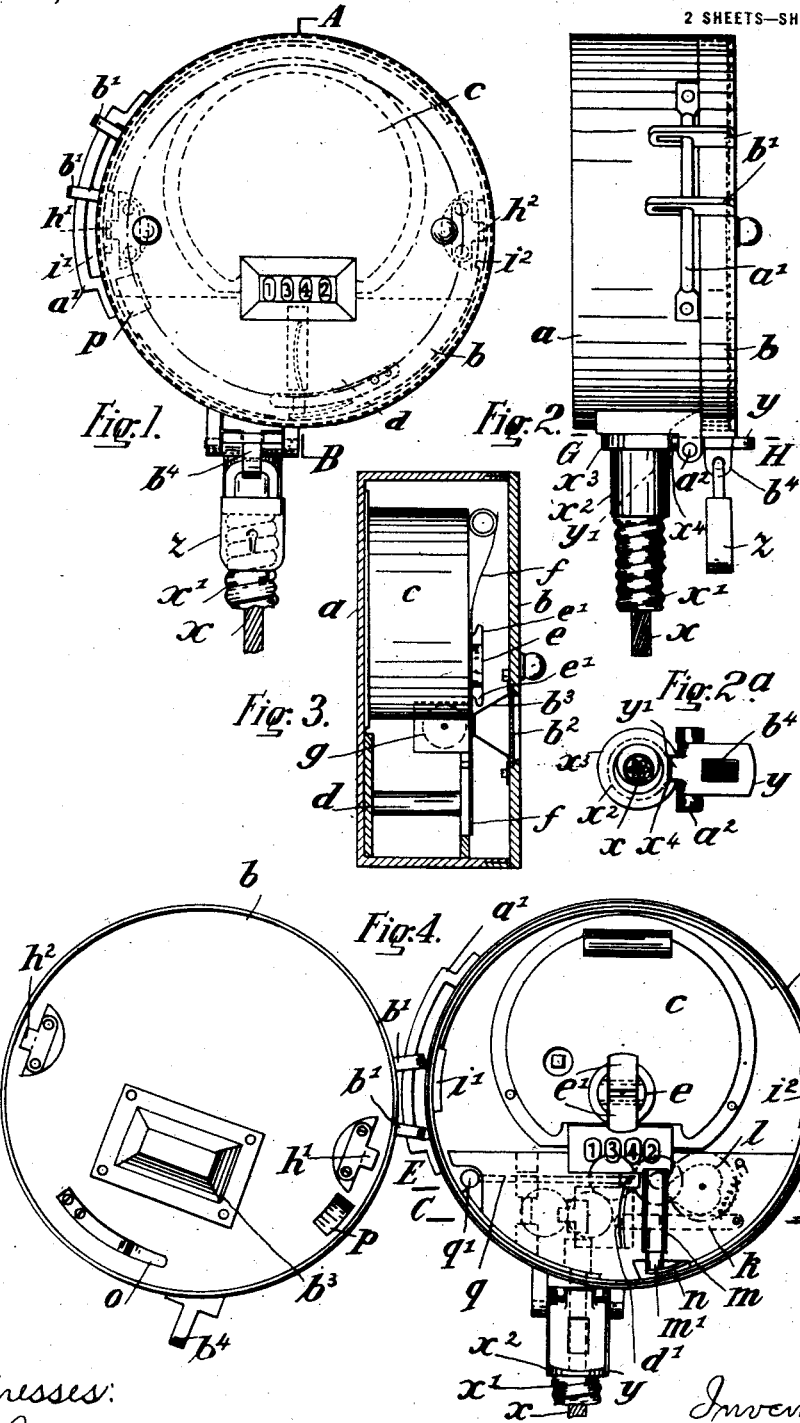

WILHELM G. BRUHN, OF BERLIN-WILMERSDORF, GERMANY.

RECORDING DEVICE FOR VEHICLES.

1,172,666. Specification of Letters Patent. Patented Feb. 22, 1916.

Application filed November 25, 1913. Serial No. 802,941.

*To all whom it may concern:*

Be it known that I, WILHELM G. BRUHN, citizen of the German Empire, residing at Berlin - Wilmersdorf, Hohenzollerndamm 27, in the Kingdom of Prussia, and German Empire, have invented certain new and useful Improvements in Recording Devices for Vehicles, of which the following is a full, clear, and exact description.

My invention relates to recording devices of a kind in which the distances covered and the times taken in covering them are automatically recorded on a paper disk which is revolved by clockwork within a certain period, *e. g.* every twelve or 24 hours. Hence the speeds of travel and the durations of stoppages are also recorded. The distances traveled are recorded by a small hole being made in the paper by a perforating pin whenever a certain distance has been covered, the pin being regularly moved to and fro in a radial direction. Whenever a unit of distance has been traveled an indicating device is fed forward one figure so that the figures which are in evidence on the indicating device always immediately show the total distance traveled.

Devices of this kind must be entirely closed (for example by securing the cover by a padlock or a lead seal) so that the interior of the device is only accessible to the proprietor of the vehicle and it must in particular only be possible to inspect the record on the paper disk and to replace the disk after unlocking the instrument. It is, however, desirable to have the readings of the indicator or cyclometer mechanism that shows the distances covered permanently visible, so that they may be seen without opening the instrument. It is also desirable that the readings of the indicator appear on the same side as the cover because frequently owing to position in which the device is fixed, *e. g.* on the mud-guard of the vehicle, only this one side is accessible. In accordance with the circular form of the recording disk the device may be made cylindrical in shape and the diameter of the casing of the instrument need only be a little larger than that of the disk.

In order to render it possible to read the indications of the indicator or cyclometer mechanism, which are to be permanently visible, on the same side as where the cover and paper disk arranged beneath the cover and parallel thereto are placed, the indicator has hitherto been placed in a special attachment at the side of the cylindrical casing. By this arrangement the device is increased in size, it is rendered difficult to make a tight cover and the cost of production is increased. (The arrangement of the indicator in the cover itself is not only unfeasible because this would result in the depth of the whole device being increased by the depth of the indicator, but also because the diameter of the casing would then have to be made larger in order to make room at the side of the recording disk for the parts that transmit the rotation of the mechanism situated in the casing to the indicator.)

By my invention it is rendered possible to produce a recording device with a circular recording disk and an indicator the indications of which are permanently visible from the side where the cover or the recording disk is placed without making the diameter of the cylindrical casing any larger than is required for the paper disk and without necessitating a lateral attachment or extension.

According to the invention the recording disk is made of transparent material (such as tracing paper or oiled paper as used for transparent envelop panels) and the readings of the indicator are made visible through the middle portion of the recording disk, which portion is not used for the records, and through a window in the cover of the instrument.

In devices of this kind it is desirable to have the recording disk entirely exposed by the act of opening the cover and the perforating pin is preferably located beneath the recording disk in the casing itself. In order that the perforating pin may not merely lift the paper disk but may make a perforation when struck against the disk a striking surface or platen must be provided which is placed close above the paper disk and extends along the whole distance traversed in a radial direction by the perforating pin. When putting in a new paper disk and whenever a record is removed this striking surface must be moved out of the way.

It is desirable, especially in large yards in which a large number of vehicles are to be checked by recording devices, that the changing of recording disks may be carried out in the shortest possible time and in the simplest possible manner, requiring the fewest possible manipulations and that in replacing a record only the smallest possible number of parts or none at all need be released by hand.

According to my invention the striking surface or platen which while in use, must be opposite the perforating pin close to the paper disk and has to be moved away when replacing a record, is automatically brought into its operative position by the act of closing the cover and is moved away by the opening of the cover. The acts of opening and closing the cover are also caused to record automatically the time at which the recording disk is inserted or at which the device is closed and at what time the recording disk is taken out or the device is opened. These registrations are desirable because the person checking the records is thereby checked himself. Finally the cover by the movement of which the above mentioned functions are accomplished is so arranged that it need not be laid aside but that it can execute all necessary movements (shifting in the direction of its axis and turning) while attached to the casing of the device. It is moreover necessary in devices of this kind to be able to insert the recording disk, which is provided with divisions corresponding to hours and minutes, so that it is properly centered and that the registrations are always made at the spots of the record, bearing the hour and minute marks, which correspond to the times at which they are made.

By this invention the insertion, centering, fastening and proper adjustment of the recording disk is simplified and the fastening device serves for the additional purpose of printing the number of the recording device on the recording disk. The printing device is an advantage because generally a large number of recording devices are used at the same time for example in cases where a vehicle proprietor wishes to check all his vehicles. Each vehicle is then provided with its own recording device. Hitherto the checking process involved the marking of the vehicle number on the recording disk of the recording device of the particular vehicle. In writing numbers containing several digits mistakes are liable to occur which render the check useless because it is afterward no longer possible to tell for sure to which device or vehicle the particular recording disk belongs. It is to be remembered in this connection that these recording disks are generally kept for a considerable time in order that the events recorded may be subsequently referred to.

Recording devices of this kind are usually driven by means of a flexible shaft or the like from the wheel of the vehicle (on motor cars they may also be driven from the motor shaft). The flexible shaft is generally coupled immediately beneath the recording device to a shaft projecting from the device by a split pin or cotter and is incased in a flexible metal pipe or the like for protection. If the coupling between the flexible shaft and the shaft of the recording device is loosened (e. g. by pulling out the cotter) the recording device will no longer be moved. For this reason it is specially important to prevent this coupling from being tampered with.

By my invention the part where the flexible shaft is coupled to the shaft of the recording device is automatically locked and secured against tampering when the cover of the recording device is closed.

An example of the invention is shown in the accompanying drawing in which,

Figure 1 is a front view of a closed recording device, Fig. 2 a side view of Fig. 1, Fig. $2^a$ is a plan view of the locking device (section on the line G—H of Fig. 2), Fig. 3 is a cross section of the device on line A—B of Fig. 1, Fig. 4 a front view of an open instrument from which the recording disk is removed, Fig. 5 is a cross section on line C—D of Fig. 4 (on a larger scale), but with the instrument closed, Fig. 6 a cross section on the line E—F of Fig. 4 (on the same scale as Fig. 4), also with the instrument closed, Fig. 7 is a portion of the recording disk on a larger scale, Fig. 8 shows a cross section of the device used for adjusting, centering and fastening the recording disk, Fig. 9 is a side view of the same device viewed in the direction of the arrow shown in Fig. 2, Fig. 10 is a plan view of Fig. 2.

$a$ is the cylindrical casing, $b$ the cover the eyes $b^1$ of which embrace an arc-shaped pivot $a^1$ attached to the casing $a$. The arc shape of the pivot $a^1$ permits of the cover $b$ being turned through the angle required for fastening and unfastening the bayonet joint of the cover. The bayonet joint consists of two ears $h^1$, $h^2$ which may be pushed beneath two arc-shaped stops $i^1$, $i^2$. The holes of the eyes $b^1$ are long so as to enable the cover to be lifted after the bayonet joint has been undone.

Instead of fastening the cover $b$ by means of eyes $b^1$, arc-shaped pivot $a^1$ and the bayonet joint $h^1$, $h^2$—$i^1$, $i^2$, the cover $b$ may be fastened to the casing $a$ by means of a hinge or a similar contrivance.

The casing $a$ is fixed to the vehicle in any approved manner, e. g. by screwing its back to the vehicle. The device is driven by means of a flexible shaft $x$, which may be rotated by the wheel of the vehicle, the shaft being inclosed in a flexible metal pipe $x^1$. A sleeve $x^2$ is slid over the metal pipe $x^1$, the sleeve having a flange $x^3$ at its upper end and being screwed onto a threaded piece of piping (not shown in the drawing) which is fixed to the bottom of the casing $a$.

The cover $b$ is fixed to the casing $a$ in a known manner by passing a staple $y$ which is hinged at the pivot $a^2$ attached to the casing $a$ over a lug $b^4$, the turning back of the staple $y$ being prevented by a padlock $z$ the clasp of which is passed through the lug $b^4$ (or by a lead seal or the like.) The staple $y$ also serves to render inaccessible the part where the flexible shaft is coupled. To this end the staple $y$ is provided with two arms. The second arm $y^1$ projects, in the position of parts shown in Fig. 2, into a notch $x^4$ of the flange $x^3$ of the sleeve $x^2$ and thereby prevents the sleeve $x^2$ from being screwed back so as to make the coupling of the shaft $x$ accessible.

If the padlock $z$ is unlocked by the proper key and is taken out of the lug $b^4$ and if the staple $y$ is then turned down and the ear $y^1$ moved out of the notch $x^1$, the sleeve $x^2$ may be screwed down and the coupling of the flexible shaft $x$ uncovered. If the cover has been lifted sufficiently it can be turned into the position shown in Fig. 4. In the casing $a$ there is a clockwork $c$ and a distance mechanism $d$ and a shaft $e$ which is turned once in a certain period of time, say 24 hours. To the shaft $e$ a recording disk $f$ may be fixed by a fastening device. Beneath the recording disk $f$ there is a perforating pin $d^1$, which is moved by the distance mechanism $d$ in a known manner, so that it is struck against the paper disk and makes a perforation whenever a unit of distance has been traveled. The perforating pin $d^1$ is fixed to a lever $k$ which is regularly moved to and fro by an eccentric driven by the distance mechanism, so that it is moved radially beneath the paper inward toward the center of the disk during a certain number of distance units and then outward from the center during the same number of units of distance. Since the recording disk $f$ is turned regularly by the clockwork $c$ the pierced points will line in zigzag lines (see Fig. 7). One to-and-fro line of the zigzag marking may for example correspond to a distance of 10 kms. or 8 miles. The angles which the straight portions of the zigzag lines form with respect to each other or the frequency of occurrence of these straight portions afford an indication of the speed of the vehicle. At the places where no perforations are made the vehicle was stopped. According to the record shown in Fig. 7 the vehicle started out at 10 past 1 o'clock and traveled rather slowly till 25 to 2 and then fast until 2 o'clock, stopped till 20 past 2 and then traveled very slowly till 25 past 3 and then somewhat faster till shortly before 4 o'clock, stopped till 10 to 5 and then traveled at varying speeds until about quarter past seven and so forth.

The distance mechanism drives a counting train $g$, which is fed forward one figure at the end of each unit of distance. The counting train $g$ is arranged immediately beneath the recording disk $f$ within the circular space which is surrounded by the ring-shaped space that is used for the records. The recording disk is made of transparent material, e. g. of tracing paper or cloth or oiled paper, such as is used for envelop panels. In the cover $b$ there is an opening $b^2$ closed by glass which is preferably larger than the space occupied by the figures forming the readings of the counter $g$. An inspection funnel $b^3$ is preferably arranged between the figures and the window $b^2$. With this arrangement the indications of the counter are easy to read when the device is closed.

In order to insure that holes are really made in the disk $f$ by the striking of the perforating pin $d^1$ and that the recording disk is not merely lifted a striking surface must be provided above the recording disk. This striking surface consists in the modification shown of a roller $m$ of elastic material, e. g. of a rubber tube slipped onto a pin $m^1$.

According to the invention the act of closing the cover $b$ is caused to move the roller $m$ automatically into its operative position and the roller is moved out of the way by the act of opening the cover so that the recording disk $f$ may be easily removed. To this end the roller $m$ and its pin $m^1$ are attached to a lever $n$. A spring $n^1$ tends to move the lever so that the roller is moved away from the recording disk. If the cover $b$ is pushed onto the casing $a$ and then turned through the angle required in order to fasten it by the bayonet joint $h^1$, $i^1$, $h^2$, $i^2$, a flat spring $o$ presses against the pin $m^1$ and moves the roller into its operative position (see Fig. 4). When the cover is turned in the opposite direction in order to undo the bayonet joint and to open the device the spring $o$ liberates the pin $m^1$ so that after the cover is lifted the roller $m$ will be moved away from the recording disk far enough to enable the disk to be easily removed from the device. The roller $m$ may be brought into its operative position in a similar manner by closing the cover when pivoted on an ordinary hinge. The turning of the cover is also utilized to automatically record on the recording disk the time at which the disk is inserted or when the device was closed and the time at which the disk is removed or the device is opened. To this end an ear $p$ is fixed on the under side of the cover. Before the cover is turned in the act of closing it (see Fig. 6) the ear $p$ is situated to the right of a pin $q^1$ which is fixed to the end of a lever $q$ pivoted beneath the paper disk $f$. The other end of this lever bears a cutter $q^2$. If the cover is moved in the direction of the arrow (see Fig. 6) in order to close the instrument, the ear $p$ presses the pin $q^1$ down against the action of the spring $q^3$ and presses the cutter $q^2$ into the paper disk $f$. A mark $r$ is thus made in the paper disk. In the example shown in Fig. 7 it is assumed that the recording disk $f$ was inserted at 20 past 12 o'clock; this is the spot indicated by the mark $r$ (Fig. 7). When the cover is turned in the opposite direction in order to open it a second mark $r$ is cut in the paper disk. By this arrangement it is possible to check the times that the inspector performs his duty. In the example shown in Fig. 6 for instance the inspector inserted the disk at 20 past 12 o'clock, the vehicle only started out at 10 minutes past 1 o'clock. By this means a check is also provided by which every irregular and unjustified opening of the device is revealed and made visible on the recording disk.

The device for fastening the recording disk consists of a supporting plate $s$ screwed on the shaft $e$, the plate having a cylindrical cavity $s^1$ and bearing above its supporting surface a cylindrical extension $s^2$ which has a smaller diameter than the plate $s$, but a larger diameter than the cavity $s^1$. The cylindrical extension $s^2$ has a cutting or slot which is as broad as the cavity $s^1$, so that only two segments of the extension $s^2$ remain. Between these segments are arranged two flaps $t^1$ and $t^2$ pivoted on the pins $u^1$ and $u^2$ and having the same breadth as the slot of the extension $s^2$. Against these flaps $t^1$ and $t^2$ is pressed a cylindrical plate $v$ by a spring $v^1$. The action of the plate $v$ and the spring $v^1$ tends to hold the flaps $t^1$ and $t^2$ in their upright or horizontal positions as the case may be. As will be seen from the plan view, Fig. 4, the flaps when in their upright position do not extend beyond the periphery of the extension $s^2$. Thus when the flaps are turned up the recording disk $f$ with its hole corresponding in diameter to the diameter of the extension $s^2$ can be pushed over the extension $s^2$. The extension $s^2$ serves to center the disk and the disk may be turned at will as long as the flaps stand upright so that it may be adjusted so as to correspond to the time it is inserted. When the adjustment is perfect the flaps are turned down and hold the disk firmly in position.

On the under side of one or both of the flaps may be engraved the number of the device with projecting figures $w$. A female die corresponding to the projecting figures will preferably be cut into the plate $s$. Thus when a flap is turned down the number of the device is imprinted on the recording disk. No doubt as to which device a used recording disk belongs can, therefore, ever arise.

I claim:

1. A recording device for vehicles, comprising a casing having an inspection opening, a clock-work therein, a transparent recording sheet driven by said clock-work beneath said opening, and a cyclometer mechanism within the casing opposite said opening, said sheet arranged to move between said mechanism and opening thereby causing said mechanism to be viewed through said sheet.

2. A recording device for vehicles, comprising a casing, a cover for said casing, a recording sheet, a clock-work for moving said sheet, a perforating pin arranged beneath said sheet, a platen for said pin arranged above said sheet, and means controlled by said cover for controlling the movement of said platen into and out of operative position.

3. A recording device for vehicles, comprising a casing, a cover for said casing, a rotating record sheet beneath said cover, a pin for perforating the latter arranged beneath said sheet, a pivoted spring-retracted platen member for engaging the upper surface of the sheet and coöperating with said pin, and a spring on the cover to yieldingly hold the platen in operative position.

4. A recording device for vehicles comprising a casing, a rotating record sheet therein, a recording pin normally out of contact with the sheet, a cover rotatable on the casing, and means operated by the rotation of the cover to move the pin into contact with the sheet.

5. A recording device for vehicles, comprising a casing, a rotating recording sheet therein, a lever pivoted in the casing carrying a pin adapted to puncture the sheet, a cover for closing the casing rotatable thereon, and a cam on the cover adapted to actuate the lever by the movement of the cover on the casing to move the pin onto the sheet.

6. A recording device for vehicles, comprising a casing, a rotating recording sheet therein, a lever pivoted in the casing carrying a pin adapted to puncture the sheet, a cover for closing the casing rotatable thereon, a cam on the cover adapted to actuate the lever by the movement of the cover on the casing to move the pin onto the sheet, and means to normally hold the pin out of contact with the latter.

7. A recording device for vehicles comprising a recording sheet having a central hole therein, a supporting plate for said sheet having an extension to enter said hole, and a spring-urged pivoted flap mounted in said extension for holding the sheet to said plate.

8. In a recording device for vehicles, a latch for the recording sheet thereof, comprising a supporting plate having a cavity therein, a slotted extension on said plate adapted to project through an aperture in the sheet, two flaps pivoted to swing in said slot, a spring-urged member in said cavity to successively engage the rear ends and sides of said flaps to hold them in raised and lowered positions.

In witness whereof, I subscribed my signature, in presence of two witnesses.

WILHELM G. BRUHN.

Witnesses:
HENRY HASPER,
WOLDEMAR HAUPT.